United States Patent
Komano et al.

(10) Patent No.: US 10,447,487 B2
(45) Date of Patent: *Oct. 15, 2019

(54) DATA GENERATING DEVICE, COMMUNICATION DEVICE, MOBILE OBJECT, DATA GENERATING METHOD, AND COMPUTER PROGRAM PRODUCT

(71) Applicant: KABUSHIKI KAISHA TOSHIBA, Tokyo (JP)

(72) Inventors: Yuichi Komano, Kanagawa (JP); Hideo Shimizu, Kanagawa (JP); Takeshi Kawabata, Kanagawa (JP)

(73) Assignee: Kabushiki Kaisha Toshiba, Tokyo (JP)

(*) Notice: Subject to any disclaimer, the term of this patent is extended or adjusted under 35 U.S.C. 154(b) by 451 days.

This patent is subject to a terminal disclaimer.

(21) Appl. No.: 14/814,534

(22) Filed: Jul. 31, 2015

(65) Prior Publication Data
US 2016/0056953 A1  Feb. 25, 2016

(30) Foreign Application Priority Data
Aug. 25, 2014 (JP) .................. 2014-170662

(51) Int. Cl.
H04L 9/32 (2006.01)
H04L 9/08 (2006.01)

(52) U.S. Cl.
CPC .......... H04L 9/3278 (2013.01); H04L 9/0866 (2013.01); H04L 2209/805 (2013.01)

(58) Field of Classification Search
CPC ................ H04L 9/3278; H04L 9/0866; H04L 2209/805; G06F 21/72; G06F 21/73
See application file for complete search history.

(56) References Cited

U.S. PATENT DOCUMENTS 6,092,231 A * 7/2000 Sze ..................... G11B 20/1866
714/758
6,857,076 B1 * 2/2005 Klein ..................... G06F 21/80
713/189
(Continued)

FOREIGN PATENT DOCUMENTS

JP 2000-92040 A 3/2000
JP 2009-59065 A 3/2009
(Continued)

OTHER PUBLICATIONS

Nedospasov-Invasive PUF Analysis, 2013 Workshop on Fault Diagnosis and Tolerance in Cryptography, 2013, pp. 30-38 (Year: 2013).*

(Continued)

Primary Examiner — Luu T Pham
Assistant Examiner — James J Wilcox
(74) Attorney, Agent, or Firm — Finnegan, Henderson, Farabow, Garrett & Dunner, L.L.P.

(57) ABSTRACT

According to an embodiment, a data generating device includes a first generator, an obtainer, a second generator, a verifier, and an operation selector. The first generator generates device-specific first data. The obtainer obtains second data from outside of the data generating device. The second generator generates third data based on the first data and the second data. The verifier verifies correctness of the third data. When the third data is determined to be incorrect, the operation selector selects at least one of regenerating the first data, re-obtaining the second data, and disabling the data generating device according to a predetermined selection rule.

18 Claims, 9 Drawing Sheets

(56) References Cited

U.S. PATENT DOCUMENTS

| | | | |
|---|---|---|---|
| 8,433,897 B2* | 4/2013 | Yoshida | H04L 9/302 380/44 |
| 8,516,269 B1* | 8/2013 | Hamlet | G06F 21/445 340/5.8 |
| 2004/0221209 A1* | 11/2004 | Kupferschmidt | G10L 19/005 714/713 |
| 2005/0114653 A1 | 5/2005 | Sudia | |
| 2006/0210082 A1* | 9/2006 | Devadas | G06F 21/31 380/277 |
| 2008/0044027 A1 | 2/2008 | Van Dijk | |
| 2008/0178010 A1 | 7/2008 | Vaterlaus et al. | |
| 2008/0195897 A1* | 8/2008 | Alaniz | H04L 41/5064 714/46 |
| 2008/0320318 A1* | 12/2008 | Huang | G11B 20/00086 713/193 |
| 2010/0031065 A1* | 2/2010 | Futa | H03K 3/0315 713/194 |
| 2010/0134848 A1 | 6/2010 | Lynggaard et al. | |
| 2010/0197362 A1* | 8/2010 | Saitoh | H04M 1/274516 455/569.2 |
| 2010/0250936 A1* | 9/2010 | Kusakawa | H04L 9/3278 713/169 |
| 2011/0191837 A1 | 8/2011 | Guajardo Merchan et al. | |
| 2011/0214160 A1 | 9/2011 | Costa et al. | |
| 2011/0246771 A1 | 10/2011 | Kashi | |
| 2012/0183135 A1* | 7/2012 | Paral | H04L 9/0866 380/44 |
| 2012/0308000 A1 | 12/2012 | Arnold et al. | |
| 2012/0321077 A1 | 12/2012 | Shiota et al. | |
| 2012/0324310 A1* | 12/2012 | Oshida | H04L 9/3278 714/755 |
| 2013/0142329 A1* | 6/2013 | Bell | H04L 9/0866 380/44 |
| 2013/0326591 A1 | 12/2013 | Jang | |
| 2014/0089685 A1 | 3/2014 | Suzuki | |
| 2014/0133651 A1* | 5/2014 | Furukawa | H04L 9/008 380/44 |
| 2014/0189359 A1 | 7/2014 | Marien et al. | |
| 2014/0258736 A1 | 9/2014 | Merchan et al. | |
| 2014/0325241 A1 | 10/2014 | Shimizu | |
| 2015/0195088 A1* | 7/2015 | Rostami | G09C 1/00 380/28 |
| 2015/0207629 A1* | 7/2015 | Oshida | H04L 9/3278 380/28 |
| 2015/0319000 A1* | 11/2015 | Falk | H04L 9/0961 713/189 |
| 2016/0041014 A1* | 2/2016 | Sameshima | G01D 21/00 702/127 |
| 2016/0211974 A1 | 7/2016 | Komano et al. | |
| 2017/0365316 A1* | 12/2017 | Wang | G11C 11/1675 |
| 2018/0076959 A1* | 3/2018 | Komano | H04L 9/0618 |

FOREIGN PATENT DOCUMENTS

| | | |
|---|---|---|
| JP | 2011-77740 A | 4/2011 |
| JP | 2011-229112 A | 11/2011 |
| JP | 2012-173388 A | 9/2012 |
| JP | 2013-003431 | 1/2013 |
| JP | 2013-031151 | 2/2013 |
| JP | 2013-251814 A | 12/2013 |
| JP | 5420114 | 2/2014 |
| JP | 2016-46719 | 4/2016 |
| WO | WO 2012/164721 A1 | 12/2012 |
| WO | WO 2013/094056 A1 | 6/2013 |
| WO | WO 2014/124023 A1 | 8/2014 |

OTHER PUBLICATIONS

Office Action issued by the U.S. Patent and Trademark Office dated Aug. 21, 2017, for U.S. Appl. No. 14/971,282.

* cited by examiner

DATA GENERATING DEVICE, COMMUNICATION DEVICE, MOBILE OBJECT, DATA GENERATING METHOD, AND COMPUTER PROGRAM PRODUCT

CROSS-REFERENCE TO RELATED APPLICATION(S)

This application is based upon and claims the benefit of priority from Japanese Patent Application No. 2014-170662, filed on Aug. 25, 2014; the entire contents of which are incorporated herein by reference.

FIELD

Embodiments described herein relate generally to a data generating device, a communication device, a mobile object, a data generating method, and a computer program product.

BACKGROUND

A technology is known in which a physically unclonable function (PUF) is used in generating data, such as an identifier used in authentication or a cryptographic key used in cryptographic communication, having a high degree of confidentiality. The PUF represents a technology in which manufacturing errors occurring during semiconductor manufacturing are put to use for the purpose of deriving device-specific output. Generally, even if the same input is given to the same PUF, the output of that PUF includes errors in some part depending on the factors such as the voltage and the temperature in the execution environment. In that regard, using an error correction technology or using the data calculated by a fuzzy extractor; the intended data, such as an identifier or a cryptographic key, can be generated in a correct manner from the error-containing output of a PUF. Meanwhile, the output of a PUF represents device-specific data. However, if data adjusted to absorb the differences between the outputs of a plurality of PUFs is used, then the outputs of PUFs can be used to generate data, such as a shared key, that is sharable among a plurality of devices.

In the following explanation, device-specific data output by a PUF is called "first data". Moreover, the data used for the purpose of generating the intended data, such as an identifier or a cryptographic key, from the first data is called "second data". Furthermore, the data such as an identifier or a cryptographic key that is generated using the first data and the second data is called "third data".

The second data can be stored in advance in a memory area in a device. However, instead of storing the second data in the device, if the second data is obtained from the outside of the device, then the required memory area in the device can be reduced thereby making it possible to cut down the manufacturing cost of the device. However, in such a configuration, for example, there is a risk of an attack mounted in the form of repeatedly inputting falsified second data to the device so as to infer the first data or the third data. Hence, it is necessary to have a countermeasure to such an attack.

DETAILED DESCRIPTION

Figure 1:
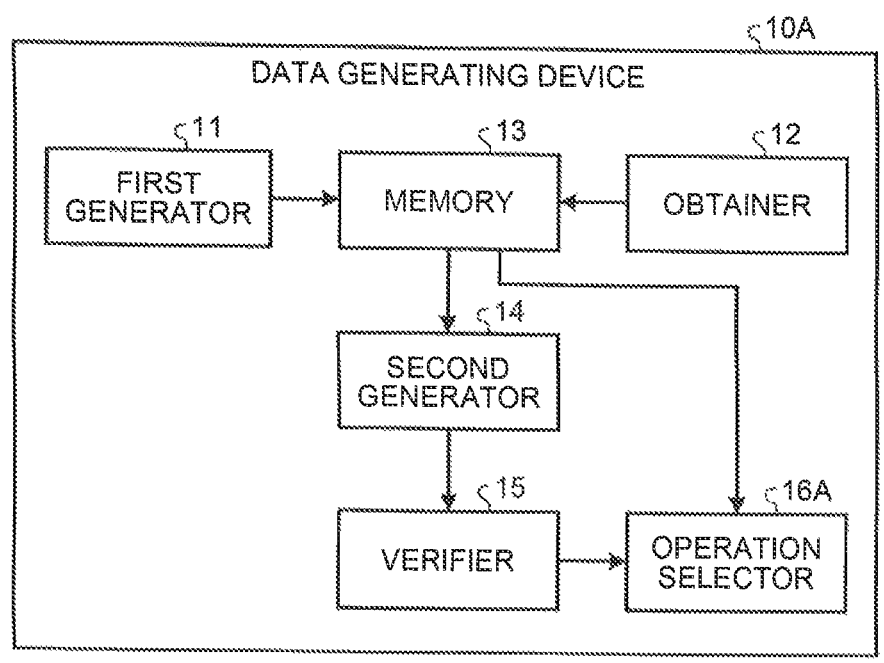
FIG. 1 is a block diagram illustrating an exemplary configuration of a data generating device according to a first embodiment.

According to an embodiment, a data generating device includes a first generator, an obtainer, a second generator, a verifier, and an operation selector. The first generator generates device-specific first data. The obtainer obtains second data from outside of the data generating device. The second generator generates third data based on the first data and the second data. The verifier verifies correctness of the third data. When the third data is determined to be incorrect, the operation selector selects at least one of regenerating the first data, re-obtaining the second data, and disabling the data generating device according to a predetermined selection rule.

A data generating device according to embodiments generates device-specific first data; obtains second data from the outside of the device; and generates third data based on the first data, and the second data. In the embodiments, although the first data is assumed to be the output of a PUF, it is not the only possible case. That is, as long as the first data represents device-specific data generated or stored in the device, it serves the purpose. Moreover, in the embodiments, the second data, which is received from the outside of the device, is assumed to be the data calculated using an error correction technology or a fuzzy extractor, or is assumed to be the data adjusted to absorb the differences between the outputs of PUFs of a plurality of devices. However, that is not the only possible case. Furthermore, in the embodiments, the third data, which is generated based on the first data and the second data, is assumed to be an identifier or a cryptographic key (a shared key). However, chat is not the only possible case.

In the configuration according to the embodiments in which the third data is generated using the second data that is received from the outside of the device, there is a risk of an attack mounted in the form of repeatedly inputting falsified second data to the device so as to infer the first data or the third data. That is, there is a risk that the first data or the third data are inferred from the device behavior that is different from the normal operations due to the input of falsified second data. Herein, the device behavior points to the presence or absence of output, the output values, the operating period of the device, the power consumption of the device, and the electromagnetic waves leaking from the device. In that regard, in the data generating device according to the embodiments, the third data that is generated based on the first data and the second data is verified for correctness. If the generated third data is determined to be incorrect, then the subsequent operation is selected according to predetermined selection rules. That makes it difficult to mount an attack of the abovementioned kind.

If the generated third data is determined to be incorrect, then the subsequent operation can be selected from regenerating the first data, re-obtaining the second data, and disabling the device. If regenerating the first data is selected, then new third data is generated based on the regenerated first data and the already-obtained second data, and the new third data is again verified for correctness. Alternatively, if re-obtaining the second data is selected, then new third data is generated based on the re-obtained second data and the already-generated first data, and the new third data is again verified for correctness. Moreover, if re-obtaining the second data is selected, then the first data can also be regenerated in tandem with re-obtaining the second data. In that case, new third data is generated based on the regenerated first data and the re-obtained second data, and the new third data is again verified for correctness. Meanwhile, if disabling the device is selected, then the data generating device is disabled. Herein, disabling the device indicates setting the device to a non-operable state. For example, unless an operation for terminating the disabled state is performed by the device manufacturer, the device cannot be restored to the operable state.

In the embodiments, for example, the device is disabled because the number of times for which the generated third data is determined to be incorrect is greater than an upper limit. As a result, the use of the device can be restricted, and it can be made difficult to mount an attack of the abovementioned kind. Moreover, even when the number of times for which the generated third data is determined to be incorrect is not greater than the upper limit; the first-data can be regenerated once in a few times without re-obtaining the second data, and the third data can be generated based on the regenerated first data and the already-obtained second data. As a result, the number of times for which the second data is received can be restricted, thereby making it more difficult to mount an attack of the abovementioned kind. Furthermore, in the case of re-obtaining the second data, if the first data is also regenerated in tandem, then the time required to mount an attack increases as compared to the case in which only the second data is re-obtained. That makes it even more difficult to mount an attack of the abovementioned kind.

Explained below in detail with reference to the accompanying drawings are specific examples of the data generating device according to the embodiments.

First Embodiment

FIG. 1 is a block diagram illustrating an exemplary configuration of a data generating device 10A according to a first embodiment. As illustrated in FIG. 1, the data generating device 10A according to the first embodiment includes a first generator 11, an obtainer 12, a memory 13, a second generator 14, a verifier 15, and an operation selector 16A.

The first generator 11 generates device-specific first data. Herein, the first data generated by the first generator 11 is not always identical, and may include a slight error upon being generated every time. Examples of the first generator 11 include an SRAM-PUF in which the initial value of a static random access memory (SRAM) is used, or an Arbiter-PUF in which the signal delay of circuitry is used.

The obtainer 12 obtains second data that is input from the outside of the device. The second data obtained by the obtainer 12 represents, for example, the data used in performing error correction with respect to the first data generated by the first generator 11, or the data used for the purpose of generating shared third data by absorbing the differences between the first data of a plurality of devices.

The memory 13 temporarily stores therein the first data, which is generated by the first generator 11, and the second data, which is obtained by the obtainer 12. Moreover, the memory 13 stores therein various parameters used by the operation selector 16A (described later).

The second generator 14 generates third data based on the first data, which is generated by the first generator 11 and temporarily stored in the memory 13, and the second data, which is obtained by the obtainer 12 and temporarily stored in the memory 13. The third data generated by the second generator 14 is, for example, an identifier used in an authentication operation or a cryptographic key used in cryptographic communication.

The verifier 15 verifies the correctness of the third data generated by the second generator 14. For example, the verifier 15 can verify the correctness of the third data generated by the second generator 14 by using the hash value of the third data. That is, the verifier 15 calculates the hash value of the third data generated by the second generator 14, and compares the calculated hash value with a hash value that has been calculated in advance as the hash value of the third data known to be correct. If the two hash values do not match, then the second generator 14 determines that the generated third data is not correct. Meanwhile, the hash value of the third data known to be correct can be stored in advance in the memory 13, or can be obtained from the outside during a verification operation performed by the verifier 15.

Alternatively, instead of using the hash value of the third data, the verifier 15 can verify the correctness of the third data generated by the second generator 14 by using a cipher text generated using the third data. In that case, the verifier 15 uses the third data, which is generated by the second generator 14, to encrypt predetermined fourth data and generates a cipher text; and compares the generated cipher text with a cipher text that is generated by encrypting the fourth data using the third data known to be correct. If the two cipher texts are not identical, then the verifier 15 determines that the third data generated by the second generator 14 is not correct. Herein, the fourth data and the cipher text generated using the third data known to be correct can be stored in advance in the memory 13, or can be obtained from the outside during a verification operation performed by the verifier 15.

Still alternatively, the verifier 15 can combine the verification performed using the hash value of the third data and the verification performed using the cipher text that is generated using the third data so as to verify the correctness of the third data generated by the second generator 14.

If the verifier 15 determines that the third data generated by the second generator 14 is not correct, then the operation selector 16A selects at least one of regenerating the first data, re-obtaining the second data, and disabling the device according to predetermined selection rules. At that time, the operation selector 16A selects regenerating the first data at a higher rate as compared to selecting re-obtaining the second data. As a result, it becomes possible to enhance the effect of making it difficult to mount an attack of the abovementioned kind.

In the first embodiment, one of the selection rules is to disable the device if the number of verification failures, which represents the number of times for which the verifier 15 determines that the third data generated by the second generator 14 is not correct, is greater than a first threshold value. The operation selector 16A according to the first embodiment follows this rule and, according to the number of verification failures and the first threshold value, determines whether or not to select disabling the device.

Moreover, in the first embodiment, another of the selection rules is to re-obtain the second data if the number of verification failures is not only equal to or smaller than the first threshold value but also a multiple of a predetermined value. The operation selector 16A according to the first embodiment follows this rule and determines whether or not to select re-obtaining the second data according to the number of verification failures, the first threshold value, and the predetermined value.

Figure 2:
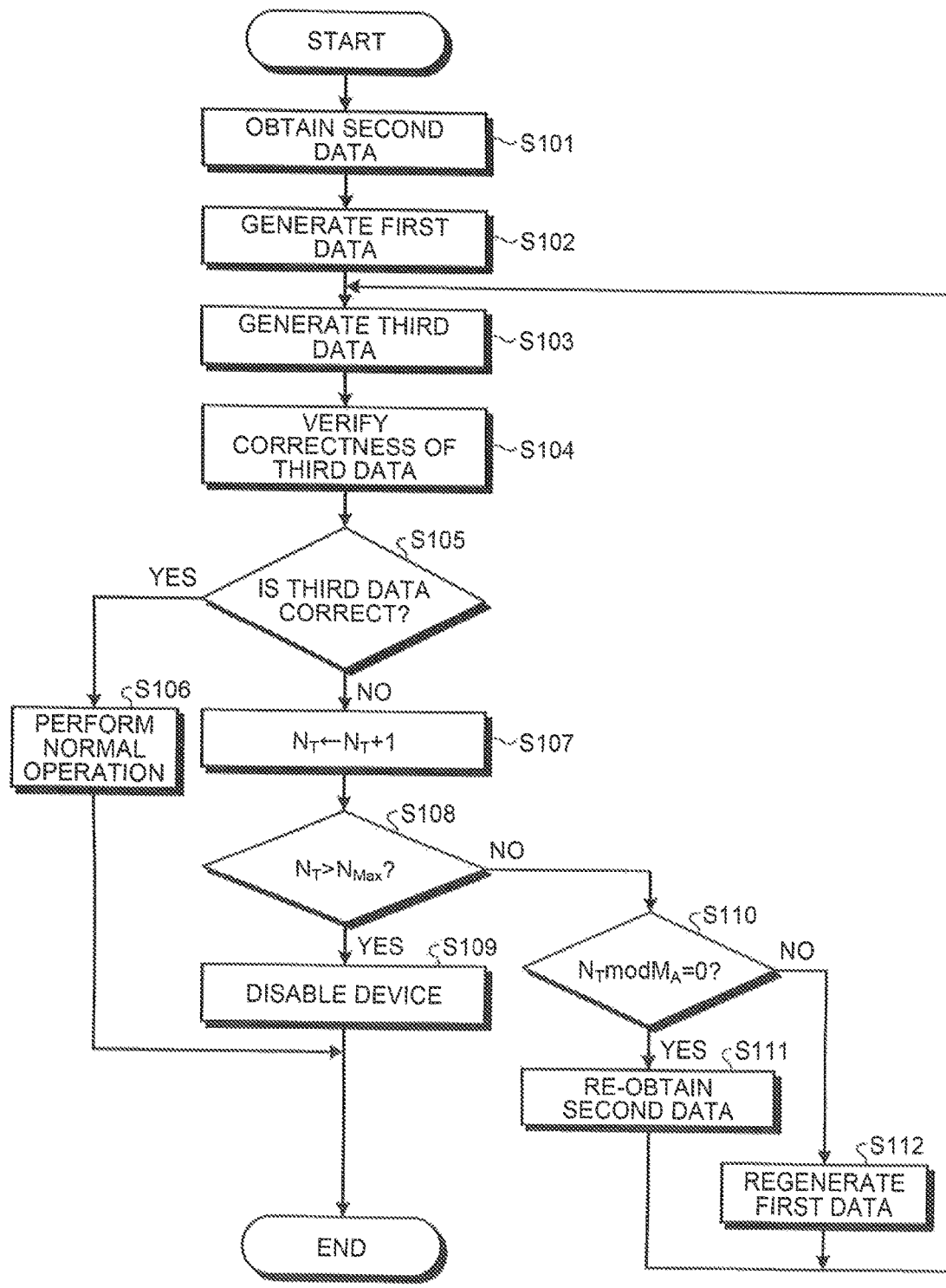
FIG. 2 is a flowchart for explaining an exemplary sequence of operations performed in the data generating device according to the first embodiment.

Explained below with reference to FIG. 2 are the operations performed in the data generating device 10A according to the first embodiment. FIG. 2 is a flowchart for explaining an exemplary sequence of operations performed in the data generating device 10A according to the first embodiment.

When starting operations in the data generating device 10A, firstly, the obtainer 12 obtains second data that is input from the outside of the device (Step S101). The second data obtained by the obtainer 12 is temporarily stored in the memory 13.

Then, the first generator 11 generates device-specific first data (Step S102). The first data generated by the first generator 11 is temporarily stored in the memory 13. Meanwhile, the order of operations performed at Steps S101 and S102 can be interchanged. That is, after the first generator 11 generates first data and temporarily stores it in the memory 13, the obtainer 12 can obtain second data and temporarily store it in the memory 13.

Subsequently, the second generator 14 generates third data based on the first data and the second data which are temporarily stored in the memory 13 (Step S103).

Then, the verifier 15 verifies the correctness of the third data, which is generated at Step S103, according to, for example, the method described above (Step S104). As a result of the verification performed at Step S104, if the third data generated at Step S103 is determined to be correct (Yes at Step S105), then the data generating device 10A performs a normal operation using the third data generated at Step S103 (Step S106). Regarding the normal operation, if the third data represents an identifier, then the normal operation is an authentication operation based on the identifier. Alternatively, if the third data represents a cryptographic key, then the normal operation is cryptographic communication using that cryptographic key. When the data generating device 10A performs a normal operation, it is desirable to delete the first data and the second data that are temporarily stored in the memory 13.

Meanwhile, as a result of the verification performed at Step S104, if the third data generated at Step S103 is determined to be incorrect (No at Step S105), then the operation selector 16A selects the subsequent operation according to a sequence given below and using a counter $N_T$ indicating the number of verification failures, a first threshold value $N_{Max}$, and a predetermined value $M_A$. The first threshold value $N_{Max}$ and the predetermined value $M_A$ are set in advance and stored in the memory 13. The counter $N_T$ is initialized to zero at the time of shipping the data generating device 10A. Moreover, when the data generating device 10A performs a normal operation, it is desirable to initialize the counter $N_T$ to zero. In that case, the number of verification failures indicated by the counter $N_T$ does not represent the total number of times of failure in verification since the shipment of the data generating device 10A but represents the number of times of failure in verification since the previous normal operation.

If the third data generated at Step S103 is determined to be incorrect (No at Step S105), then the operation selector 16A firstly increments the counter $N_T$ by one (+1) (Step S107) and determines whether or not the counter $N_T$ is greater than the first threshold value $N_{Max}$ (Step S108). If the counter $N_T$ is greater than the first threshold value $N_{Max}$ (Yes at Step S108), then the operation selector 16A selects disabling the device as the subsequent operation. As a result, the data generating device 10A is disabled (Step S109).

On the other hand, if the counter $N_T$ is equal to or smaller than the first threshold value $N_{Max}$ (No at Step S108), then the operation selector 16A determines whether or not $N_T$ mod $M_A$=0 holds true (Step S110). Herein, A mod B represents the remainder of A divided by B. Thus, determining whether or not $N_T$ mod $M_A$=0 holds true implies determining whether or not the counter $N_T$ is divisible by the predetermined value $M_A$ (i.e., whether or not the counter $N_T$ is a multiple of the predetermined value $M_A$). If $N_T$ mod $M_A$=0 holds true (Yes at Step S110), then the operation selector 16A selects re-obtaining the second data as the subsequent operation. As a result, the obtainer 12 re-obtains the second data that is re-input from the outside of the device (Step S111). Then, the system control returns to Step S103 and the subsequent operations are repeated. In this case, new third data can be generated based on the re-obtained second data and the already-generated first data stored in the memory 13. Alternatively, firstly, the first data can be regenerated in tandem with re-obtaining the second data, and then new third data can be generated based on the re-obtained second data and the regenerated first data.

However, if $N_T$ mod $M_A$=0 does not hold true (No at Step S110), then the operation selector 16A selects regenerating the first data as the subsequent operation. As a result, the first generator 11 regenerates device-specific first data (Step S112). Then, the system control returns to Step S103 and the subsequent operations are repeated. In this case, the second data is not re-obtained, and new third data is generated based on the regenerated first data and the already-obtained second data stored in the memory 13.

In the first embodiment, the frequency at which the operation selector 16A selects re-obtaining the second data can be controlled using the predetermined value $M_A$. Thus, the predetermined value $M_A$ serves as a parameter indicating the frequency of re-obtaining the second data when the third data is determined to be incorrect. If the predetermined, value $M_A$ is set to a sufficiently large value, then regenerating the first data is selected at a higher rate as compared to selecting re-obtaining the second data. Moreover, in the case when re-obtaining the second data is selected, if the first data is regenerated in tandem with re-obtaining the second data, then regenerating the first data is selected at a higher rate as compared to selecting re-obtaining the second data regardless of the predetermined value $M_A$.

As described above, in the data generating device 10A according to the first embodiment, when the number of times of failure in verification is greater than the first threshold value, the device is disabled. Moreover, even when the number of times of failure in verification is equal to or smaller than the first threshold value, if the number of times of failure in verification is not a multiple of a predetermined value, new third data is generated without re-obtaining the second data. Hence, in the data generating device 10A according to the first embodiment, it becomes possible to make it difficult to mount an attack of inputting falsified second data and inferring the first data or the third data.

Second Embodiment

Given below is the explanation of a second embodiment. In the second embodiment, the selection rules are partially different from the first embodiment. In the following explanation, the constituent elements identical to the first embodiment are referred to by the same reference numerals, and the relevant explanation is not repeated. Thus, the explanation is given only about the distinguishing portion of the second embodiment.

Figure 3:
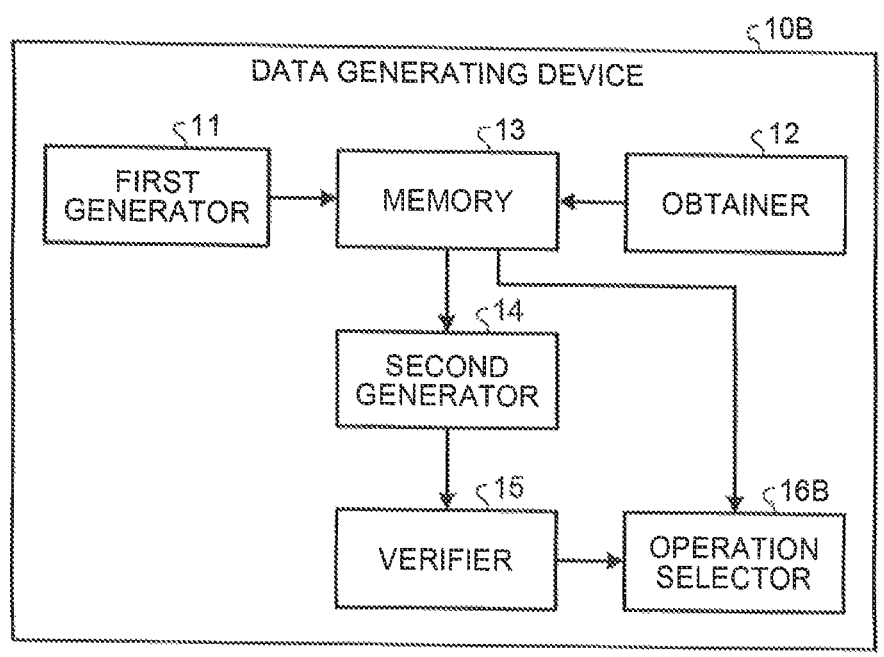
FIG. 3 is a block diagram illustrating an exemplary configuration of a data generating device according to a second embodiment.

FIG. 3 is a block diagram illustrating an exemplary configuration of a data generating device 10B according to the second embodiment. The data generating device 10B according to the second embodiment includes an operation selector 16B in place of the operation selector 16A according to the first embodiment. Other from that, the configuration is identical to the configuration of the data generating device 10A according to the first embodiment (see FIG. 1).

In the second embodiment, in an identical manner to the first embodiment, one of the selection rules is to disable the device if the number or times of failure in verification, which represents the total number of times for which the verifier 15 determines that the third data generated by the second generator 14 is not correct, is greater than the first threshold value. The operation selector 16B according to the second embodiment follows this rule and, according to the number of times of failure in verification and the first threshold value, determines whether or not to select disabling the device.

Moreover, in the second embodiment, another of the selection rules is to re-obtain the second data if the number of times of failure in verification is equal to or smaller than the first threshold value and if a selected value that is randomly selected from a predetermined numerical range is equal to or smaller than a second threshold value set within the predetermined numeral range. The operation selector 16B according to the second embodiment follows this rule and determines whether or not to select re-obtaining the second data according to the number of times of failure in verification, the first threshold value, the selected value, and the second threshold value.

Figure 4:
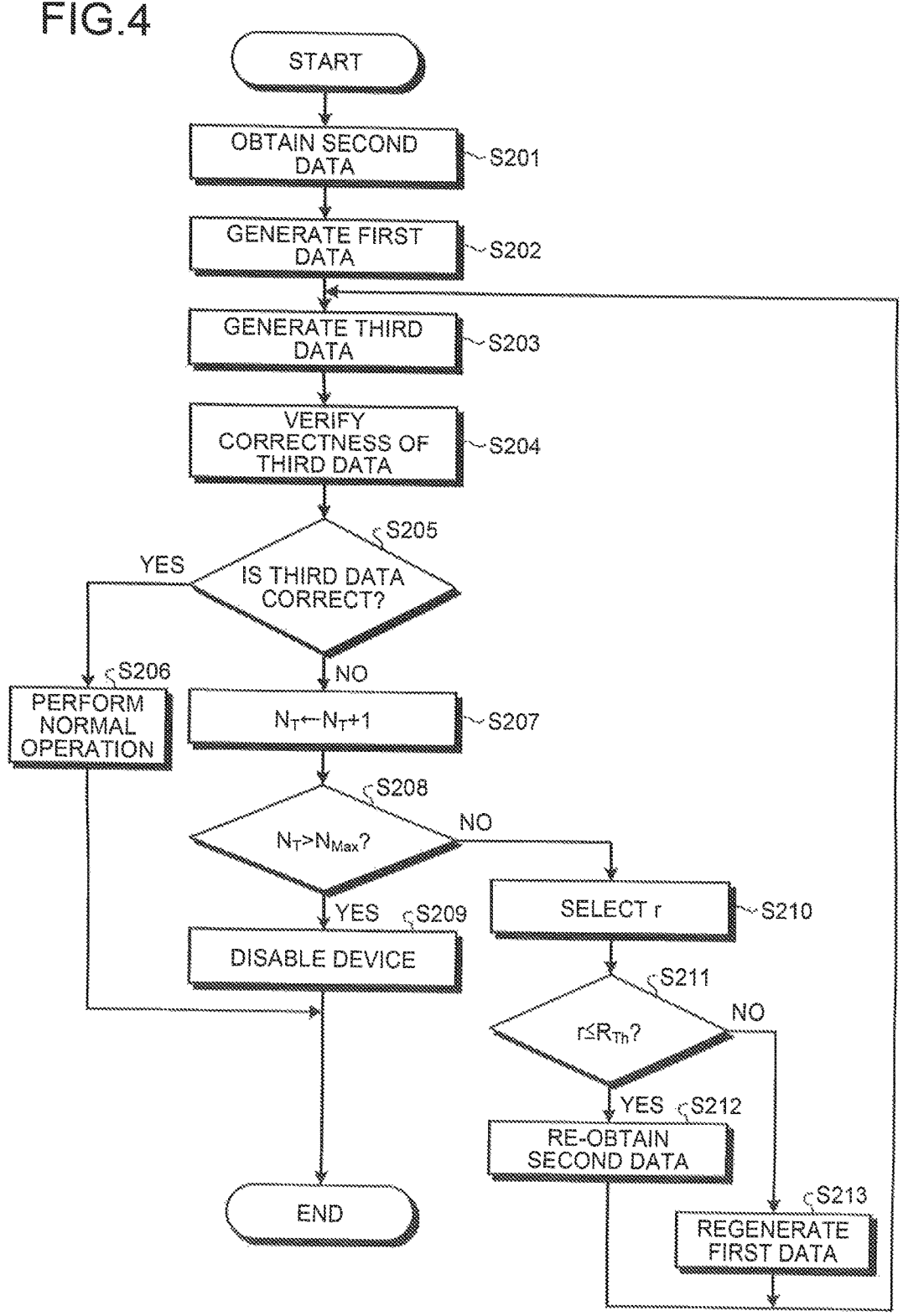
FIG. 4 is a flowchart for explaining an exemplary sequence of operations performed in the data generating device according to the second embodiment.

Explained below with reference to FIG. 4 are the operations performed in the data generating device 10B according to the second embodiment. FIG. 4 is a flowchart for explaining an exemplary sequence of operations performed in the data generating device 10B according to the second embodiment. With reference to FIG. 4, the operations from Steps S201 to S206 are identical to the operations (from Steps S101 to S106 illustrated in FIG. 2) performed in the data generating device 10A according to the first embodiment. Hence, the relevant explanation is not repeated.

In the second embodiment, as a result of the verification performed at Step S204, if the third data generated at Step S203 is determined to be incorrect (No at Step S205), then the operation selector 16B selects the subsequent operation according to a sequence given below and using the counter $N_T$ indicating the number of times of failure in verification, the first threshold value $N_{Max}$, a selected value r that is randomly selected in a predetermined numerical range, and a second threshold value $R_{Th}$ that is set within the predetermined numeral range. The first threshold value $N_{Max}$ and the second threshold value $R_{Th}$ are set in advance and stored in the memory 13. The counter $N_T$ is initialized to zero at the time of shipping the data generating device 10B. Moreover, when the data generating device 10E performs a normal operation, it is desirable to initialize the counter $N_T$ to zero.

If the third data generated at Step S203 is determined to be incorrect (No at Step S205), then the operation selector 16B firstly increments the counter N by one (+1) (Step S207) and determines whether or not the counter N is greater than the first threshold value $N_{Max}$ (Step S208). If the counter $N_T$ is greater than the first threshold value $N_{Max}$ (Yes at Step S208), then the operation selector 16E selects disabling the device as the subsequent operation. As a result, the data generating device 10B is disabled (Step S209).

However, if the counter $N_T$ is equal to or smaller than the first threshold value $N_{Max}$ (No at Step S208), then the operation selector 16B randomly selects the selected value r from the predetermined numerical range (Step S210) and determines whether or not the selected value r is equal to or smaller than the second threshold value $R_{Th}$ (Step S211). If the selected value r is equal to or smaller than the second threshold value $R_{Th}$ (Yes at Step S211), then the operation selector 16B selects re-obtaining the second data as the subsequent operation. As a result, the obtainer 12 re-obtains the second data that is re-input from the outside of the device (Step S212). Then, the system control returns to Step S203 and the subsequent operations are repeated. In this case, new third data can be generated based on the re-obtained second data and the already-generated first data. Alternatively, firstly, the first data can be regenerated in tandem with re-obtaining the second data, and then new third data can be generated based on the re-obtained second data and the regenerated first data.

However, if the selected value r is greater than the second threshold value $R_{Th}$ (No at Step S211), then the operation selector 16B selects regenerating the first data as the subsequent operation. As a result, the first generator 11 regenerates device-specific first data (Step S213). Then, the system control returns to Step S203 and the subsequent operations are repeated. In this case, the second data is not re-obtained, and new third data is generated based on the regenerated first data and the already-obtained second data.

In the second embodiment, the probability at which the operation selector 16B selects re-obtaining the second data can be controlled using the second threshold value $R_{Th}$. Thus, the second threshold value $R_{Th}$ serves as a parameter indicating the probability of re-obtaining the second data when the third data is determined to be incorrect. If the second threshold value $R_{Th}$ is set to a sufficiently large value within the predetermined numerical range, then regenerating the first data is selected at a higher rate as compared to selecting re-obtaining the second data. Moreover, in the case when re-obtaining the second data is selected, if the first data is regenerated in tandem with re-obtaining the second data, then regenerating the first data is selected at a higher rate as compared to selecting re-obtaining the second data regardless of the second threshold value $R_{Th}$.

As described above, in the data generating device 10B according to the second embodiment, when the number of times of failure in verification is greater than the first threshold value, the device is disabled. Moreover, even when the number of times of failure in verification is equal to or smaller than the first threshold value, if a selected value that is randomly selected from a predetermined numerical range is greater than the second threshold value set within the predetermined numeral range, new third data is generated without re-obtaining second data. Hence, in the data generating device 10B according to the second embodiment, it becomes possible to make it difficult to mount an attack of inputting falsified second data and inferring the first data or the third data.

Third Embodiment

Given below is the explanation of a third embodiment. In the third embodiment, during the verification performed for a predetermined number of times in the immediate past, if the third data is frequently determined to be incorrect, the first threshold value that serves as the upper limit of the number of times of failure in verification is lowered so as to make it easier to select disabling the device. As the selection rules, the same selection rules as explained in the first embodiment are applied. Alternatively, the same selection rules as explained in the second embodiment can also be applied. In the following explanation, the constituent elements identical to the first embodiment are referred to by the same reference numerals, and the relevant explanation is not repeated. Thus, the explanation is given only about the distinguishing portion of the third embodiment.

Figure 5:
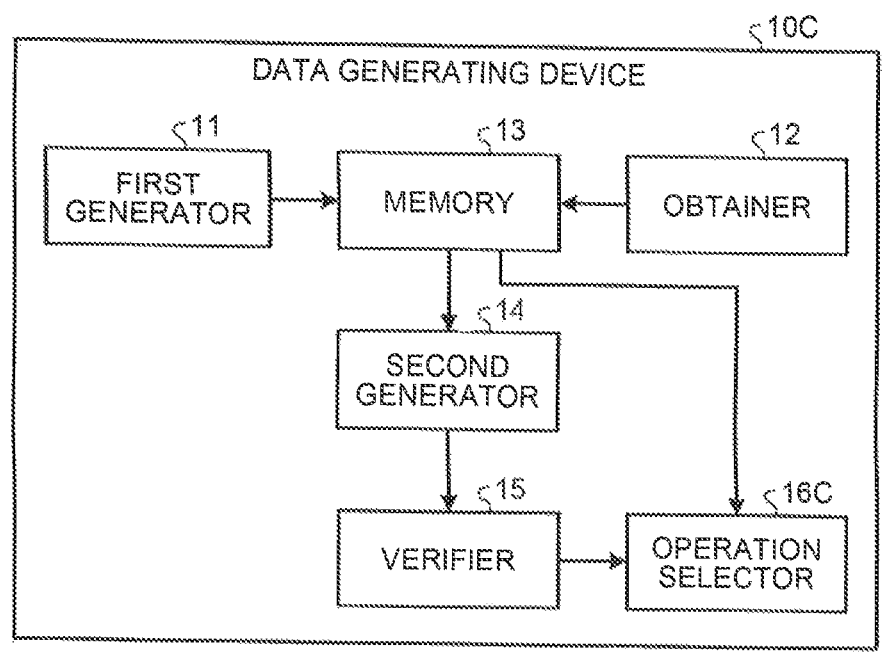
FIG. 5 is a block diagram illustrating an exemplary configuration of a data generating device according to a third embodiment.

FIG. 5 is a block diagram illustrating an exemplary configuration of a data generating device 10C according to the third embodiment. The data generating device 10C according to the third embodiment includes an operation selector 16C in place of the operation selector 16A according to the first embodiment. Other from that, the configuration is identical to the configuration of the data generating device 10A according to the first embodiment (see FIG. 1).

In the third embodiment, the operation selector 16C counts the number of times of failure in verification that represents the total number of times for which the verifier 15 determines that the third data generated by the second generator 14 is not correct, as well as the number of times of recent failure that represents the recent R number of times (where R is an arbitrary natural number) for which the verifier 15 determines that the third data generated by the second generator 14 is not correct. If the recent number of times of failure is greater than a third threshold value, then the operation selector 16C lowers the first threshold value that is the upper limit of the number of times of failure in verification (i.e., changes the first threshold value to a value smaller than the current value), and determines whether or not to select disabling the device according to the lowered first threshold value.

Figure 6:
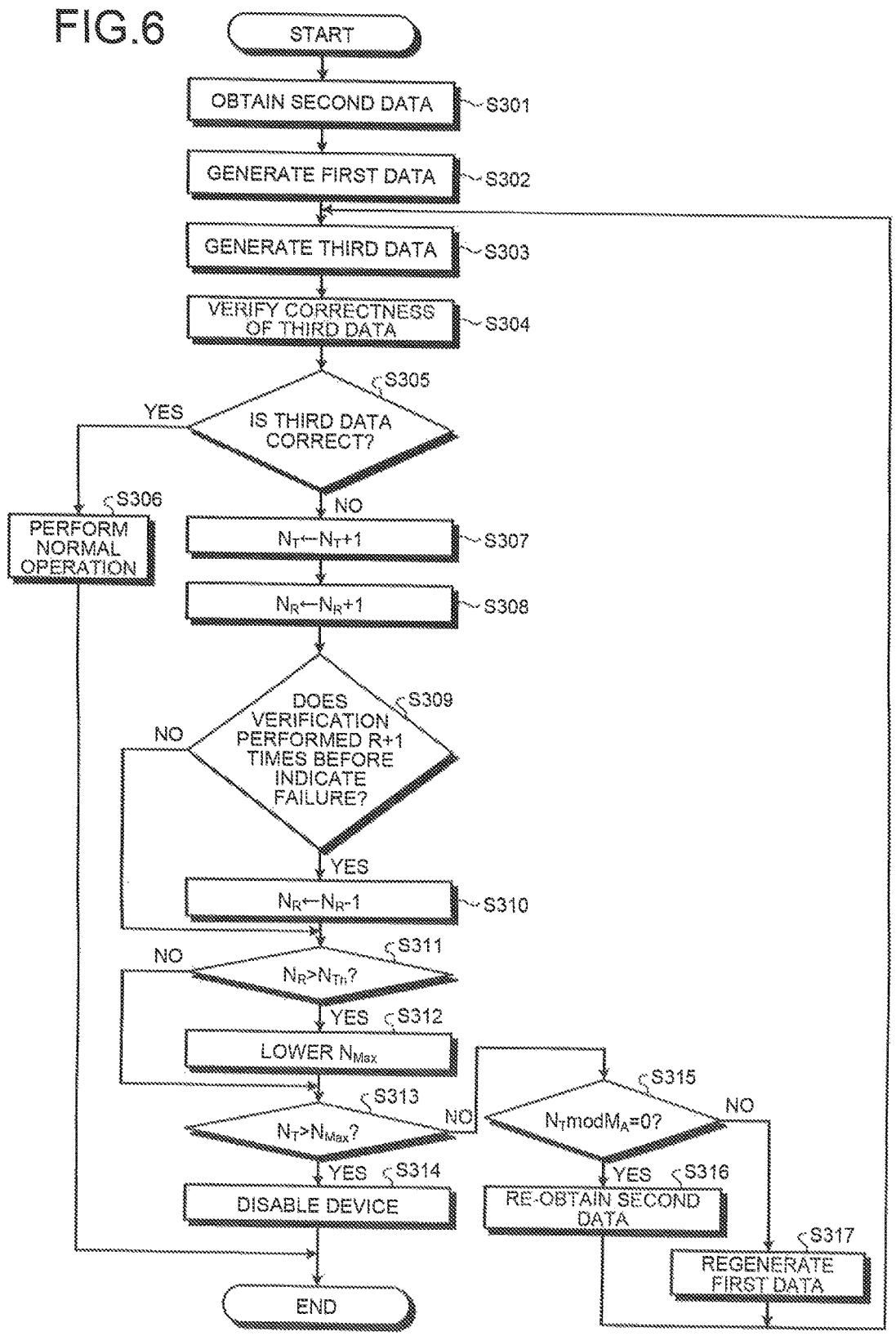
FIG. 6 is a flowchart for explaining an exemplary sequence of operations performed in the data generating device according to the third embodiment.

Explained below with reference to FIG. 6 are the operations performed in the data generating device 10C according to the third embodiment. FIG. 6 is a flowchart for explaining an exemplary sequence of operations performed in the data generating device 10C according to the third embodiment. With reference to FIG. 6, the operations from Steps S301 to S306 are identical to the operations (from Steps S101 to S106 illustrated in FIG. 2) performed in the data generating device 10A according to the first embodiment. Hence, the relevant explanation is not repeated.

In the third embodiment, as a result of the verification performed at Step S304, if the third data generated at Step S303 is determined to be incorrect (No at Step S305), then the operation selector 16C selects the subsequent operation according to a sequence given below and using the counter $N_T$ indicating the number of times of failure in verification, a counter $N_R$ indicating the recent number of times of failure, the first threshold value $N_{Max}$, a third threshold value $N_{Th}$, and the predetermined value $M_A$. The first threshold value $N_{Max}$ and the third threshold value $N_{Th}$ are set in advance and stored in the memory 13. The counters $N_T$ and $N_R$ are initialized to zero at the time of shipping the data generating device 10B. Moreover, when the data generating device 10B performs a normal operation, it is desirable to initialize the counters $N_T$ and $N_R$ to zero.

If the third data generated at Step S303 is determined to be incorrect (No at Step S305), then the operation selector 16E increments the counter $N_T$ by one (+1) (Step S307) and increments the counter $N_R$ by one (+1) (Step S308). Subsequently, the operation selector 16C confirms the verification result obtained R+1 times before by the verifier 15. If the verification result obtained R+1 times before by the verifier 15 indicates failure, that is, indicates that the third data is determined to be incorrect (Yes at Step S309), then the operation selector 16C decrements the counter $N_R$ by one (−1) (Step S310). Herein, the verification result obtained R+1 times before by the verifier 15 can be confirmed by referring an already-stored history of past verification results obtained by the verifier 15. On the other hand, if the verification result obtained R+1 times before by the verifier 15 indicates success, that is, indicates that the third data is determined to be correct (No at Step S309), then the operation at Step S310 is skipped.

Subsequently, the operation selector 16C determines whether or not the counter $N_R$ is greater than the third threshold value $N_{Th}$ (Step S311). If the counter $N_R$ is greater than the third threshold value $N_{Th}$ (Yes at Step S311), then the operation selector 16C lowers the first threshold value $N_{Max}$ (Step S312). However, if the counter $N_R$ is equal to or smaller than the third threshold value $N_{Th}$ (No at Step S311), the operation at Step S312 is skipped.

Then, the operation selector 16C determines whether or not the counter $N_T$ is greater than the first threshold value $N_{Max}$ (Step S313). If the counter $N_T$ is greater than the first threshold value $N_{Max}$ (Yes at Step S313), then the operation selector 16C selects disabling the device as the subsequent operation. As a result, the data generating device 10C is disabled (Step S314).

However, if the counter $N_T$ is equal to or smaller than the first threshold value $N_{Max}$ (No at Step S313), then the operation selector 16C determines whether or not $N_T$ mod $M_A=0$ holds true (Step S315). If $N_T$ mod $M_A=0$ holds true (Yes at Step S315), then the operation selector 16C selects re-obtaining the second data as the subsequent operation. As a result, the obtainer 12 re-obtains the second data that is re-input from the outside of the device (Step S316). Then, the system control returns to Step S303 and the subsequent operations are repeated. In this case, new third data can be generated based on the re-obtained second data and the already-generated first data stored in the memory 13. Alternatively, firstly, the first data can be regenerated in tandem with re-obtaining the second data, and then new third data can be generated based on the re-obtained second data and the regenerated first data.

However, if $N_T$ mod $M_A=0$ does not hold true (No at Step S315), then the operation selector 16C selects regenerating the first data as the subsequent operation. As a result, the first generator 11 regenerates device-specific first data (Step S317). Then, the system control returns to Step S303 and the subsequent operations are repeated. In this case, the second data is not re-obtained, and new third data is generated based on the regenerated first data and the already-obtained second data stored in the memory 13.

As described above, in the data generating device 10C according to the third embodiment, if the recent number of times of failure, which represents the recent R number of times for which the verifier 15 determines that the third data generated by the second generator 14 is not correct, is greater than the third threshold value, then the first threshold value serving as the upper limit of the number of times of failure in verification is lowered. Then, the number of times of failure in verification is compared with the lowered first threshold value to determine whether or not to select disabling of the device. Hence, in the data generating device 10C according to the third embodiment, it becomes possible to make it difficult to mount an attack of inputting falsified second data and inferring the first data or the third data.

Fourth Embodiment

Given below is the explanation of a fourth embodiment. According to the fourth embodiment, if the device is repeatedly used in an environment outside of an operation guaranteeing range, disabling the device is selected regardless of the selection rules. Regarding the attacks that can be mounted on a data generating device according to the fourth embodiment, it is possible to think of an attack of inputting falsified second data and inferring the first data or the third data, and an attack of operating the device in an environment outside of the operation guaranteeing range and inferring the first data or the third data from the device behavior. In that regard, in the fourth embodiment, when it is thought that an attack is being mounted, the device is disabled so as to make it difficult to mount the attack. As the selection rules, the same selection rules as explained in the first embodiment can be applied, or the same selection rules as explained in the second embodiment can be applied. Moreover, in an identical manner to the third embodiment, the configuration can be such that, when the recent number of times of failure becomes greater than the third threshold value, the first threshold value is lowered. In the following explanation, the constituent elements identical to the first embodiment are referred to by the same reference numerals, and the relevant explanation is not repeated. Thus, the explanation is given only about the distinguishing portion of the fourth embodiment.

Figure 7:
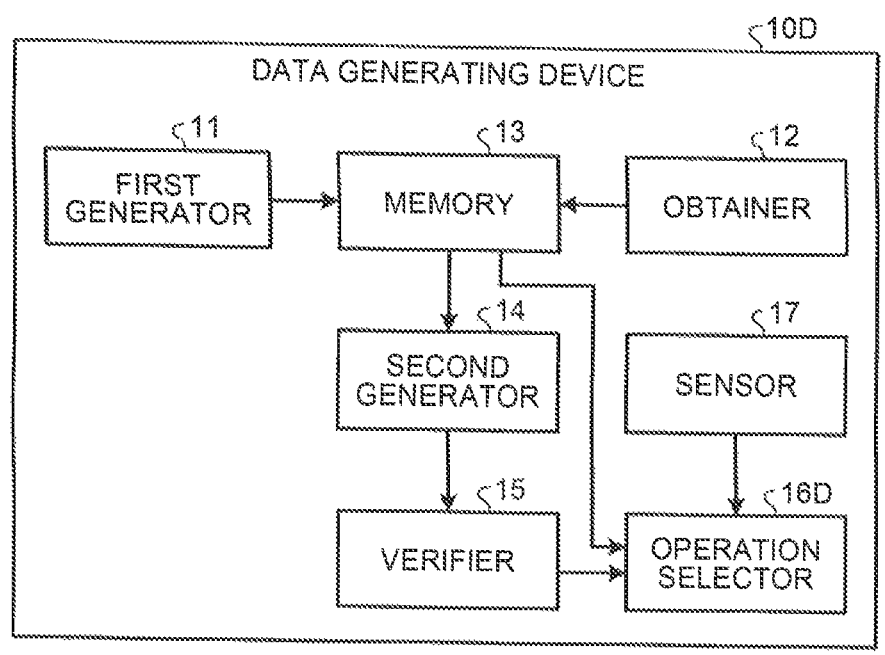
FIG. 7 is a block diagram illustrating an exemplary configuration of a data generating device according to a fourth embodiment.

FIG. 7 is a block diagram illustrating an exemplary configuration of a data generating device 10D according to the fourth embodiment. The data generating device 10D according to the fourth embodiment further includes a sensor 17 and includes an operation selector 16D in place of the operation selector 16A according to the first embodiment. Other from that, the configuration is identical to the configuration of the data generating device 10A according to the first embodiment (see FIG. 1).

The sensor 17 detects a value indicating the operating environment of the data generating device 10D. More particularly, the sensor 17 detects, for example, the external voltage, the current, the temperature, or the electromagnetic radiation applied to the data generating device 10D or detects the execution period inside the data generating device 10D. The detected value that is detected by the sensor 17 is sent to the operation selector 16D.

According to the fourth embodiment, the operation selector 10D performs operations based on the abovementioned selection rules as well as performs a sensor abnormality operation. In the sensor abnormality operation, the number of times for which the detected value of the sensor 17 was an abnormal value is counted. When the number of times for which the detected value of the sensor 17 was an abnormal value becomes greater than an upper limit, disabling the device is selected regardless of the selection rules.

Figure 8:
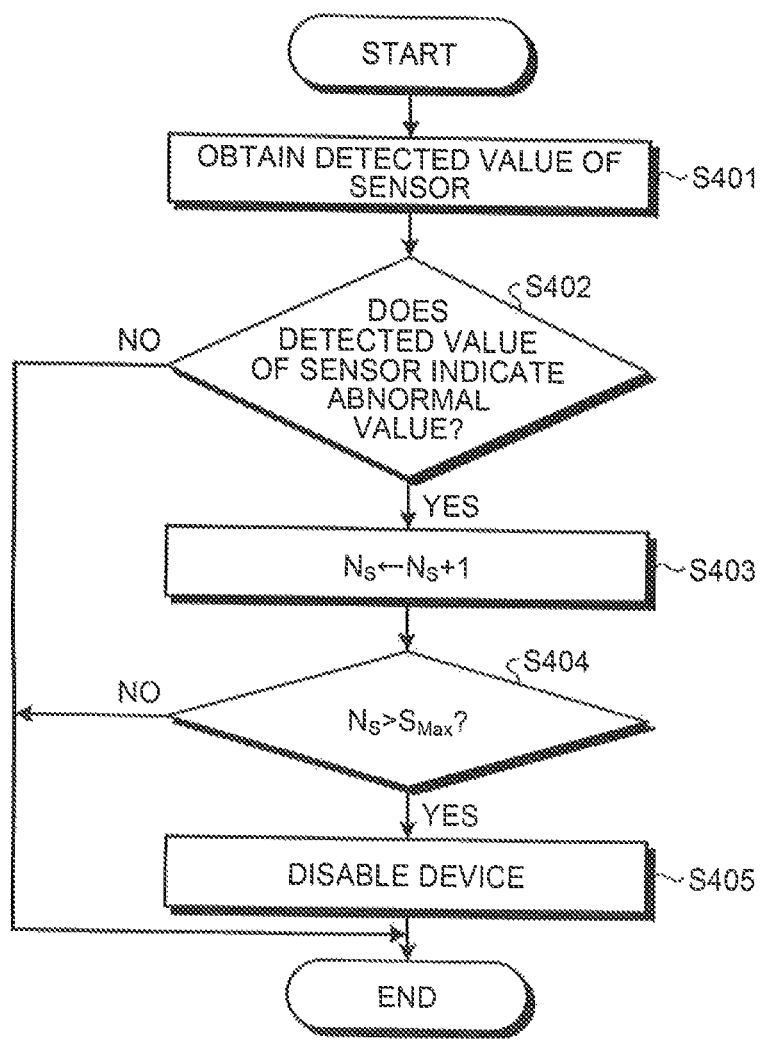
FIG. 8 is a flowchart for explaining an exemplary sequence of operations performed during a sensor abnormality operation.

FIG. 8 is a flowchart for explaining an exemplary sequence of operations performed during the sensor abnormality operation. Herein, the sensor abnormality operation is performed by the operation selector 16D in parallel to (independent of) the operations illustrated in FIG. 2, 4, or 6. That is, in the data generating device 10D according to the fourth embodiment, aside from performing the basic operations illustrated in FIG. 2, 4, or 6; the operation selector 16D also performs the sensor abnormality operation illustrated in FIG. 8.

For example, the operation selector 16D performs the sensor abnormality operation, which is illustrated in FIG. 8, in a periodic manner at predetermined cycles using a counter $N_S$ representing the total number of times for which the sensor 17 has output an abnormal value and using a fourth threshold value $S_{Max}$. Herein, the threshold value $S_{Max}$ is set in advance and stored in the memory 13. The counter $N_S$ is initialized to zero an the time of shipping the data generating device 10D. Moreover, when the data generating device 10D performs a normal operation, it is desirable to initialize the counter $N_S$ to zero.

Once the sensor abnormality operation starts, the operation selector 16D obtains the detected value detected by the sensor 17 (Step S401) and determines whether or not the detected value is an abnormal value (Step S402). Herein, an abnormal value is a value indicating that the data generating device 10D is being used in an environment outside of the operation guaranteeing range.

If the detected value obtained at Step S401 is not an abnormal value (No at Step S402), then the operation selector 16D ends the operations and waits for the next timing for starting the sensor abnormality operation. However, if the detected value obtained at Step S401 is an abnormal value (Yes at Step S402), then the operation selector 16D increments the counter $N_S$ by one (+1) (Step S403) and determines whether or not the counter $N_S$ is greater than the fourth threshold value $S_{Max}$ (Step S404). If the counter $N_S$ is greater than the fourth threshold value $S_{Max}$ (Yes at Step S404), then the operation selector 16D disables the data generating device 10D (Step S405). On the other hand, if the counter $N_S$ is equal to or smaller than the fourth threshold value $S_{Max}$ (No at Step S404), then the operation selector 16D ends the operations and waits for the next timing for starting the sensor abnormality operation.

In the fourth embodiment, the explanation is given for an example in which the sensor abnormality operation is performed independent of the basic operations of the data generating device 10D. However, alternatively, it is also possible to associate the sensor abnormality operation with the basic operations of the data generating device 10D. For example, if it is determined chat the detected value detected by the sensor 17 is an abnormal value, then the counter $N_T$ indicating the number of times of failure in verification can be incremented and the operation selection can be done according to the incremented counter $N_T$. Alternatively, if it is determined that the detected value detected by the sensor 17 is an abnormal value, then the basic operations can be terminated and restarted from the stage of generating the first data or obtaining the second data.

As described above, in the data generating device 10D according to the fourth embodiment, the sensor abnormality operation is performed in addition to the basic operations explained in the first to third embodiments. If the total number of times for which the sensor 17 has output an abnormal value is greater than the fourth threshold value, the device is disabled. Hence, in the data generating device 10D according to the fourth embodiment, it becomes possible to make it difficult to mount an attack of inputting falsified second data and inferring the first data or the third data. Not only that, it also becomes possible to make it difficult to mount an attack of inferring the first data and the second data from the behavior of the device when operated outside of the operation guaranteeing range.

Example of Application of Data Generating Device

As described above, the data generating devices 10A, 10B, 10C, and 10D according to the embodiments described above (hereinafter, collectively referred to as the data generating device 10 according to the embodiments) generate the third data in the form of, for example, an identifier used in an authentication operation or a cryptographic key used in cryptographic communication. Hence, the data generating device 10 according to the embodiments can be installed and used in a communication device that, for example, performs an authentication operation or performs cryptographic communication. With that, it becomes possible to enhance the communication safety.

Figure 9:
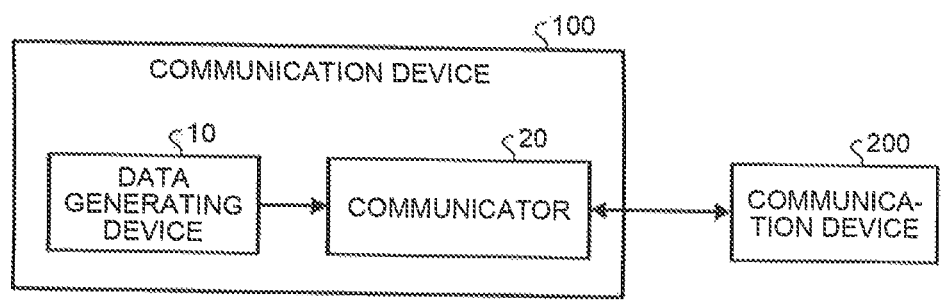
FIG. 9 is a diagram illustrating an overall configuration of a communication device.

FIG. 9 is a diagram illustrating an overall configuration of a communication device 100 in which the data generating device 10 according to the embodiments is installed. As illustrated in FIG. 9, the communication device 100 includes the data generating device 10 according to the embodiments and a communicator 20. Herein, the communicator 20 performs communication with another communication device 200 using the third data that is generated in the data generating device 10 and that is determined to be correct by the verifier 15. For example, in the case in which the data generating device 10 generates an identifier of the communication device 100 as the third data; the communicator 20 sends the identifier, which is generated in the data generating device 10, to the other communication device 200 for the purpose of an authentication operation to authenticate the communication device 100. Moreover, for example, in the case in which the data generating device 10 generates a cryptographic key as the third data, the communicator 20 sends a cipher text, which is encrypted using the concerned cryptographic key, to the other communication device 200 or decrypts a cipher text, which is received from the other communication device 200, using the concerned cryptographic key.

The communication device 100 of this type can be installed in, for example, mobile objects (such as automobiles, railroad wagons, airplanes, and marine vessels) and can be used as a node of a communication network built in the mobile objects.

Figure 10:
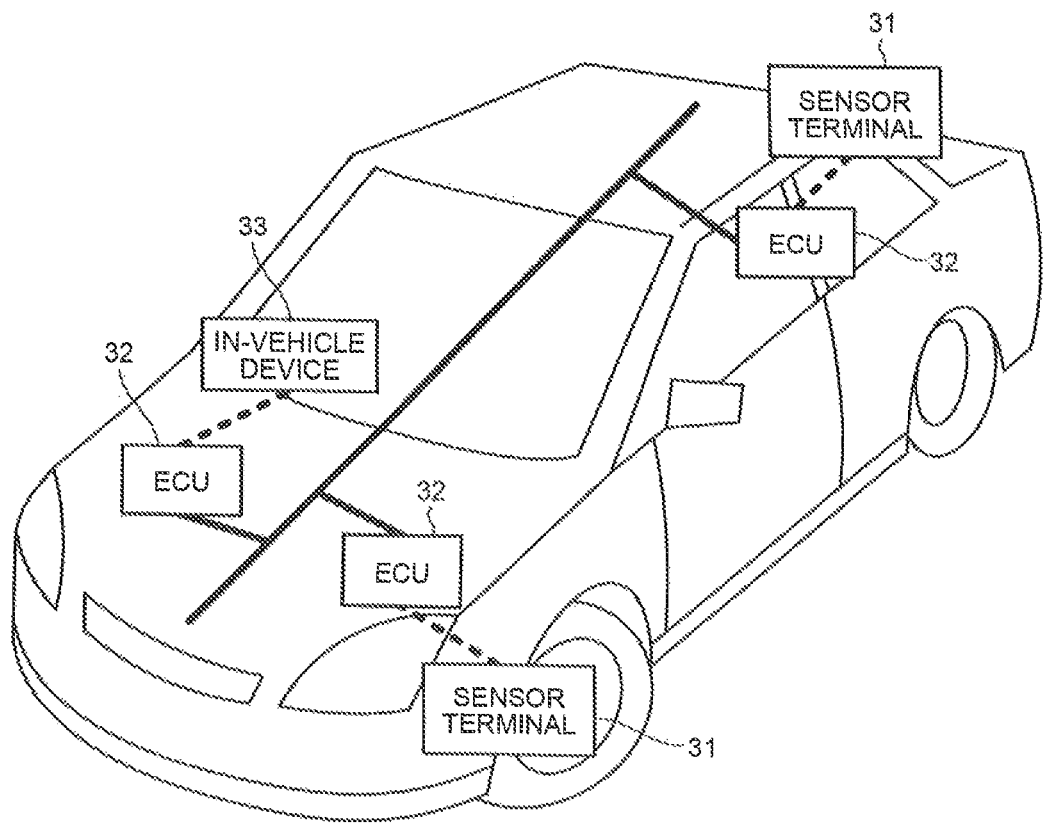
FIG. 10 is a schematic diagram illustrating a general outline of a communication network built in an automobile.

In a mobile object of recent years, the operations of a plurality of devices are performed in a coordinated manner. For that reason, it is often the case that a communication network is built for the purpose of exchanging information among the devices. For example, in an automobile, a communication network as illustrated in FIG. 10 is built in which the following components serve as nodes: sensor terminals 31 that gather a variety of information; electronic control units (ECUs) 32 that control the operations of components using the information gathered by the sensor terminals 31; and an in-vehicle device 33 that has the operations controlled by one of the ECUs 32. In order for the automobile to operate with safety, it is necessary that the communication between the sensor terminals 31 and the ECUs 32 is performed in a proper manner, that the communication among a plurality of different ECUs 32 is performed in a proper manner, and the communication between one of the ECUs 32 and the in-vehicle device 33 is performed in a proper manner. That is, it is desirable that the sensor terminals 31 and the ECUs 32; a plurality of different ECUs 32; and one of the ECU and the in-vehicle device 33 mutually authenticate the validness of communication and protect the communication details by means of, for example, cryptographic communication (for preventing falsification and preserving confidentiality). In order to achieve such authentication and protection of communication details, the use of identifiers and cryptographic keys become necessary.

Meanwhile, since the sensor terminals 31, the ECUs 32, and the in-vehicle device 33 are the property of the user, they can be subjected to wrongful analysis. For that reason, if information such as identifiers or cryptographic keys is stored in, for example, a nonvolatile memory, then there is a risk that such information is wrongfully analyzed and that the communication between the sensor terminals 31 and the ECUs 32, the communication among a plurality of ECUs 32, and the communication between one of the ECUs 32 and the in-vehicle device 33 is falsified or tapped.

However, if the sensor terminals 31, the ECUs 32, and the in-vehicle device 33 are configured as the communication device 100, it becomes possible to protect the sensor terminals 31, the ECUs 32, and the in-vehicle device 33 from wrongful analysis. For example, if the sensor terminals 31 are configured as the communication device 100, the second data can be stored in the ECUs 32 with which the sensor terminals 31 perform communication. When the sensor terminals 31 require the third data; the second data can be sent to the sensor terminals 31 from the ECUs 32 so that the sensor terminals 31 can input the second data to the built-in data generating device for generating the third data.

Meanwhile, not only in the example of an automobile illustrated in FIG. 10, if various devices serving as the nodes of the communication network built in any mobile object are configured as the communication device 100, it becomes possible to achieve authentication and protection of communication among various devices installed in that mobile object. That enables achieving enhancement in the operations and safety of the mobile object.

Supplementary Explanation

The data generating device 10 according to the embodiments can be implemented using, for example, coordination between hardware and software. In that case, for example, the data generating device 10 according to the embodiments has the hardware configuration of a general-purpose computer system that includes a processor such as a central processing unit (CPU), a main memory such as a random access memory (RAM), and an auxiliary memory such as a read only memory (ROM). The processor uses the main memory and executes computer programs provided as software so that the functional constituent elements of the data generating device 10 according to the embodiments (i.e., the first generator 11, the obtainer 12, the second generator 14, the verifier 15, and the operation selectors 16A, 16B, 16C, and 16D) are implemented.

The computer programs for implementing the functional constituent elements of the data generating device 10 according to the embodiments are stored in advance in a ROM or the like. Alternatively, the computer programs can be recorded as installable or executable files in a computer-readable recording medium such as a compact disk read only memory (CD-ROM), a flexible disk (FD), a compact disk readable (CD-R), or a digital versatile disk (DVD). Still alternatively, the computer programs can be saved as downloadable files on a computer connected to a communication network such as the Internet or can be made available for distribution through a communication network such as the Internet.

The computer programs contain a module for the component corresponding to each of the abovementioned functional constituent elements of the data generating device 10 according to the embodiments. For example, a processor such as a CPU uses a main memory such as a RAM, and reads the computer programs from an auxiliary memory such as a ROM and executes them. As a result, the components are loaded in the main memory, and each of the abovementioned functional constituent elements of the data generating device 10 according to the embodiments is generated in the main memory.

Meanwhile, the abovementioned functional constituent elements of the data generating device 10 according to the embodiments can be implemented using dedicated hardware such as an application specific integrated circuit (ASIC) or a field-programmable gate array (FPGA).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A data generating device comprising:
    processing circuitry configured to function as:
    a first generator to generate device-specific first data output by a physically unclonable function (PUF);
    an obtainer to obtain second data from outside of the data generating device;
    a second generator to generate third data based on the device-specific first data and the second data, wherein the third data comprises an identifier or cryptographic key;
    a verifier to verify correctness of the third data, wherein the verifier: generates a cipher text by encrypting fourth data, which is stored in advance or obtained from outside of the data generating device, using the third data generated by the second generator, and
    when the generated cipher text is not identical to a cipher text that is generated by encrypting the fourth data using the third data known to be correct and that is stored in advance or obtained from outside of the data generating device, determines that the third data generated by the second generator is not correct; and
    an operation selector configured to select a subsequent operation when the third data is determined to be incorrect, wherein:
    when a number of verification failures, which represents a total number of times for which the third data is determined to be incorrect, is greater than a first threshold, the operation selector is configured to select disabling the data generating device,
    when the number of the verification failures is equal to or smaller than the first threshold, the operation selector is configured to select regenerating the device-specific first data or re-obtaining the second data,
    when the number of verification failures among a predetermined number of latest verifications is greater than a second threshold value, the operation selector is configured to lower the first threshold value to a value smaller than a current value, and
    before selecting disabling the data generating device, the operation selector is configured to select a process at least once for performing regenerating of the device-specific first data without performing re-obtaining of the second data.

2. The data generating device according to claim 1, wherein the operation selector is configured to select, when the number of verification failures is equal to or smaller than the first threshold value and a multiple of a predetermined value, re-obtaining the second data.

3. The data generating device according to claim 1, wherein the operation selector is configured to select, when the number of verification failures is equal to or smaller than the first threshold value and when a selected value that is randomly selected from a predetermined numerical range is equal to or smaller than a third threshold value set within the predetermined numeral range, re-obtaining the second data.

4. The data generating device according to claim 1, further comprising a sensor to detect at least one of voltage, current, electromagnetic radiation, temperature, and an execution time period of the data generating device, wherein: when a number of times of abnormal outputs, which represents a total number of times for which the sensor has output an abnormal value, is greater than a fourth threshold value, the operation selector is configured to select disabling the data generating device even when the number of verification failures is equal to or smaller than the first threshold value.

5. The data generating device according to claim 1, wherein the verifier:
    calculates a hash value of the third data generated by the second generator, and when the calculated hash value is not identical to a hash value that is of the third data known to be correct and that is stored in advance or obtained from outside of the data generating device, determines that the third data generated by the second generator is not correct.

6. A communication device comprising:
    the data generating device according to claim 1; and
    a communicator to communicate with an external device using the third data which is generated by the second generator and which is determined to be correct by the verifier.

7. A vehicle comprising:
    a body, and
    a communication network built in the body, wherein:
    the communication network includes the communication device according to claim 6, the communication device being a node of the communication network.

8. The data generating device according to claim 1, wherein the operation selector is configured to select regenerating the device-specific first data at a higher rate as compared to selecting re-obtaining the second data.

9. The data generating device according to claim 1, wherein the second data is calculated using error correction technology or a fuzzy extractor.

10. The data generating device according to claim 1, wherein the second data comprises data used in performing error correction on the device-specific first data.

11. The data generating device according to claim 1, wherein the second data comprises data adjusted to absorb the differences between the first data output by the PUF and device-specific data output by a plurality of PUFs.

12. A data generating method implemented in a data generating device, the method comprising:

generating, by a first generator, device-specific first data output by a physically unclonable function (PUF);

obtaining, by an obtainer, second data from outside of the data generating device;

generating, by a second generator, third data based on the device-specific first data and the second data, wherein the third data comprises an identifier or cryptographic key;

verifying, by a verifier, correctness of the third data, wherein verifying comprises: generating a cipher text by encrypting fourth data, which is stored in advance or obtained from outside of the data generating device, using the third data generated by the second generator, and when the generated cipher text is not identical to a cipher text that is generated by encrypting the fourth data using the third data known to be correct and that is stored in advance or obtained from outside of the data generating device, determining that the third data generated by the second generator is not correct; and selecting, by an operation selector, a subsequent operation when the third data is determined to be incorrect, wherein:

when a number of verification failures, which represents a total number of times for which the third data is determined to be incorrect, is greater than a first threshold, selecting selects disabling the data generating device, when the number of the verification failures is equal to or smaller than the first threshold, selecting regenerating the device-specific first data or re-obtaining the second data, when the number of verification failures among a predetermined number of latest verifications is greater than a second threshold value, lowering, by the operation selector, lowers the first threshold value to a value smaller than a current value, and before selecting disabling the data generating device, selecting a process at least once for performing regenerating of the device-specific first data without performing re-obtaining of the second data.

13. The data generating method according to claim 12, wherein the second data is calculated using error correction technology or a fuzzy extractor.

14. The data generating method according to claim 12, wherein the second data comprises data used in performing error correction on the device-specific first data.

15. The data generating method according to claim 12, wherein the second data comprises data adjusted to absorb the differences between the first data output by the PUF and device-specific data output by a plurality of PUFs.

16. A computer program product comprising a non-transitory computer readable medium including programmed instructions, wherein the instructions, when executed by a computer that serves as a data generating device, cause the computer to execute:

generating device-specific first data output by a physically unclonable function (PUF);

obtaining second data from outside of the data generating device;

generating third data based on the device-specific first data and the second data, wherein the third data comprises an identifier or cryptographic key;

verifying correctness of the third data, wherein verifying comprises:

generating a cipher text by encrypting fourth data, which is stored in advance or obtained from outside of the data generating device, using the third data generated by the second generator, and when the generated cipher text is not identical to a cipher text that is generated by encrypting the fourth data using the third data known to be correct and that is stored in advance or obtained from outside of the data generating device, determining that the third data generated by the second generator is not correct; and selecting a subsequent operation when the third data is determined to be incorrect, wherein:

when a number of verification failures, which represents a total number of times for which the third data is determined to be incorrect, is greater than a first threshold, selecting disabling the data generating device, when the number of the verification failures is equal to or smaller than the first threshold, selecting, regenerating the device-specific first data or re-obtaining the second data, when the number of verification failures among a predetermined number of latest verifications is greater than a second threshold value, lowering the first threshold value to a value smaller than a current value, and before selecting disabling the data generating device, selecting a process at least once for performing regenerating of the device-specific first data without performing re-obtaining of the second data.

17. The computer program product according to claim 16, wherein the second data is calculated using error correction technology or a fuzzy extractor.

18. The computer program product according to claim 16, wherein the second data comprises data used in performing error correction on the device-specific first data.

* * * * *